United States Patent [19]

Sauer

[11] Patent Number: 4,627,645
[45] Date of Patent: Dec. 9, 1986

[54] FLEXIBLE PIPE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 699,320

[22] Filed: Feb. 5, 1985

[30] Foreign Application Priority Data

Feb. 10, 1984 [DE] Fed. Rep. of Germany ....... 3404739

[51] Int. Cl.⁴ ............................................. F16L 35/00
[52] U.S. Cl. ..................................... 285/39; 285/110; 285/236; 285/286; 285/373; 285/330
[58] Field of Search ............... 285/235, 236, 373, 383, 285/419, 420, 286, 110, 330, 39, 911; 24/279

[56] References Cited

U.S. PATENT DOCUMENTS

| 1,255,417 | 2/1918 | Hedges | 24/279 X |
|---|---|---|---|
| 1,497,549 | 6/1924 | Contadi | 24/279 X |
| 2,424,436 | 7/1947 | Crater . | |
| 3,142,881 | 8/1964 | Johnston | 24/279 |
| 3,233,907 | 2/1966 | Stanton . | |
| 3,376,055 | 4/1968 | Donroe . | |
| 3,430,989 | 3/1969 | Wendt | 285/110 |
| 3,565,468 | 2/1971 | Garrett | 24/279 X |
| 3,584,352 | 6/1971 | Turner . | |

FOREIGN PATENT DOCUMENTS

| 1078200 | 3/1960 | Fed. Rep. of Germany ...... 285/110 |
|---|---|---|
| 1806616 | 5/1970 | Fed. Rep. of Germany . |
| 7316306 | 8/1973 | Fed. Rep. of Germany . |
| 730415 | 5/1955 | United Kingdom . |
| 913904 | 12/1962 | United Kingdom . |
| 2055416 | 3/1981 | United Kingdom ................... 24/279 |

OTHER PUBLICATIONS

Advertising Brochure of Eternit Aktiengesellschaft, 1 page.

Primary Examiner—Dave W. Arola
Attorney, Agent, or Firm—Peter K. Kontler

[57] ABSTRACT

A pipe coupling wherein an elastic sleeve receives the end portions of two pipes and has a partition which extends between the end portions of the pipes. The sleeve is surrounded by a split ring in the form of a band whose end portions are spot welded to strip-shaped female components of a device for tightening the band around the sleeve. The median sections of the female components define with the band two aligned passages for the shank of a bolt whose head can be rotated to move it nearer to a nut which meshes with the shank and extends into a centrally located corrugation of the band. The head and nut flank the median sections of the two female components of the tightening device. Each end section of each of the two female components is welded to the adjacent portions of the band at two or more locations which are disposed at different distances from the gap between the two components.

14 Claims, 5 Drawing Figures

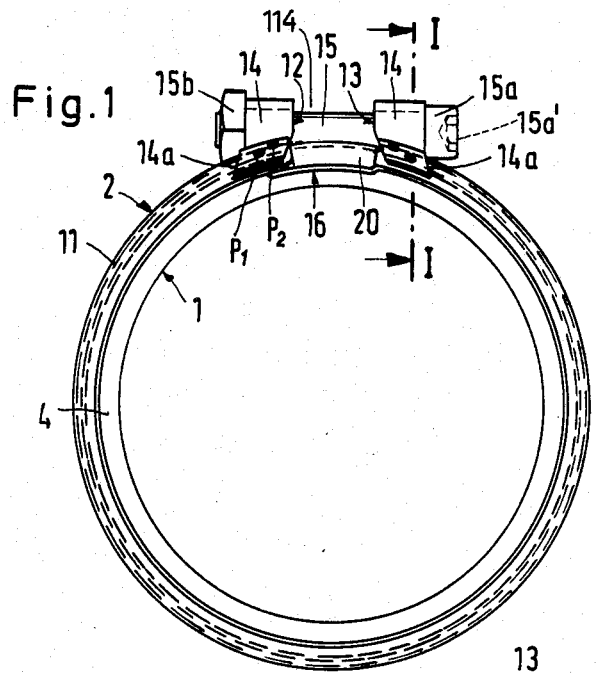
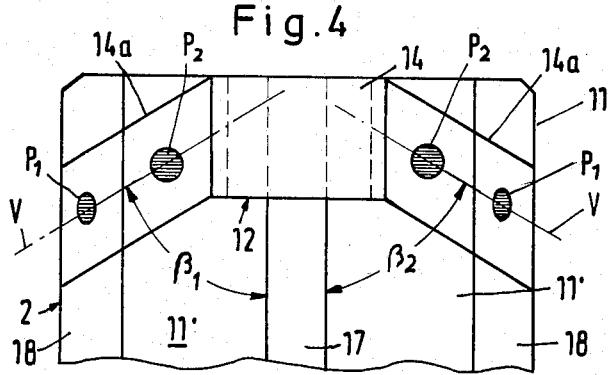

FLEXIBLE PIPE COUPLING

CROSS-REFERENCE TO RELATED CASE

The pipe coupling of the present invention constitutes an improvement over and a further development of the flexible pipe coupling which is disclosed in the commonly owned copending patent application Ser. No. 664,346 filed Oct. 24, 1984 by Heinz Sauer.

BACKGROUND OF THE INVENTION

The present invention relates to flexible pipe couplings in general, and more particularly to improvements in flexible pipe couplings of the type wherein an elastic sleeve which can consist of rubber or an equivalent material surrounds the end portions of the pipes which are to be coupled to each other and is surrounded by a clamp serving to bias the internal surface of the sleeve against the external surfaces of the end portions of the pipes.

The aforementioned commonly owned copending patent application Ser. No. 664,346 discloses a flexible pipe couling wherein the sleeve has a ring-shaped partition which extends from its internal surface and between the end faces of the two pipes and the clamp includes a band in the form of a split ring with L-shaped projections at its ends. The first leg of each projection is bonded to the external surface of the respective end of the split ring, and the second leg of each projection extends radially outwardly from the split ring and has a hole for the shank of a bolt which mates with a nut and is used to move the second legs of the two projections nearer to each other in order to tighten the split ring around the elastic sleeve. The marginal portions of the split ring slope toward the external surfaces of the respective pipes and overlie the respective open ends of the sleeve, and the central portion of the split ring is formed with a corrugation which extends into a groove in the external surface of the sleeve.

The flexible pipe coupling which is disclosed in the copending patent application Ser. No. 664,346 can be used with advantage to establish a fluidtight connection between drain pipes which consist of cast iron. The L-shaped projections of its clamp consist of sheet metal and are welded to the split ring. The clamp is intended to tighten the sleeve around the end portions of the pipe with a force which suffices to ensure that the sleeve can withstand substantial stresses tending to move the two pipes substantially axially and away from each other, i.e., to extract the end portions of the pipes from the sleeve. It has been found that the ability of a pipe coupling with L-shaped projections at the ends of the split ring to resist extraction of the end portions of the pipes from the sleeve is rather limited, primarily because the second legs of the L-shaped projections tend to bend in response to rotation of the nut and shank relative to each other in order to reduce the distance between the second legs and such bending takes place before the split ring can clamp the sleeve with a force which is required to ensure that the sleeve is held in requisite frictional engagement with the external surfaces of the pipes. The thickness and strength of the L-shaped projections cannot be increased at will, not only because this would contribute to the bulk, weight and cost of the clamp but also because the first legs of relatively thick projections cannot be readily spot welded to the respective ends of the split ring. Spot welding is the currently preferred mode of bonding the projections to the split ring. Still further, relatively thick, heavy, stiff and bulky projections would adversely influence the ability of the split ring to ensure the establishment of a reliable seal between the two pipes during bending of the sleeve, i.e., on movement of one of the pipes to a position in which its axis is inclined with reference to the axis of the other pipe. More specifically, relatively heavy and thick projections would prevent the aforementioned corrugation of the split ring from compensating for eventual tolerances in the outer diameters of the pipes, and such heavy and thick projections would further prevent adequate flexing of the sleeve under the above outlined circumstances, i.e., when the axis of one of the pipes which are coupled to each other is inclined with reference to the axis of the other pipe.

The tightening or clamping force which is furnished by the bolt and nut and is applied to the central portions of the second legs is transmitted primarily or to a larger extent to the marginal portions of the split ring diametrically opposite the two projections. The marginal portions are bent inwardly toward the external surfaces of the respective pipes and they apply to the sleeve radial forces which are greater in the region diametrically opposite the projections than at the end portions of the split ring. Such non-uniform distribution of radial forces, as considered in the circumferential direction of the marginal portions of the split ring, reduces the reliability of the clamp as concerns its ability to resist axial stresses, i.e., a movement of the end portions of the pipes away from each other. Premature bending of the second legs relative to the first legs of the projections in response to tightening of the clamp around the sleeve is undesirable because the second legs are likely to come into actual abutment with each other, and to thus prevent further tightening of the clamp around the sleeve, before the sleeve undergoes a deformation which suffices to prevent leakage of the conveyed fluid and/or ready extraction of the end portions of the pipes from the sleeve. Non-uniform distribution of radial forces, as considered in the circumferential direction of the marginal portions of the split ring, is undesirable on the ground that this reduces the likelihood of the establishment of a predictable and reliable seal between the internal surface of the sleeve and the external surfaces of the pipes, on the ground that it prevents the sleeve from furnishing an adequate sealing action when one of the pipes is moved to a position in which its axis is inclined relative to the axis of the other pipe, and on the ground that the pipes can be readily moved axially and away from each other, e.g., in response to increasing pressure of the confined fluid medium. The likelihood of unsatisfactory sealing action and/or insufficient resistance of the sleeve to axial movements of the pipes away from each other is especially pronounced when the clamp employs a single bolt and nut and when the width of the band-shaped split ring is relatively small, e.g., in the range of between 35 and 50 mm.

OBJECTS AND SUMMARY OF THE INVENTION

An object of the invention is to provide a flexible pipe coupling which is constructed and assembled in such a way that the clamp can more reliably tighten the sleeve around the end portions of the pipes without increasing the bulk, weight and/or cost of the clamp.

Another object of the invention is to provide novel and improved projections at the ends of the split ring which forms part of the improved clamp.

A further object of the invention is to provide a novel and improved sleeve for use in the above outlined coupling.

An additional object of the invention is to provide a novel and improved clamp for use in the above outlined coupling.

Still another object of the invention is to provide a novel and improved method of securing the projections to the ends of the split ring.

A further object of the invention is to provide a coupling wherein the projections of the clamp are less likely to undergo deformation in response to tightening of the clamp around the sleeve than in heretofore known couplings.

The invention is embodied in a coupling for the establishment of a fluidtight connection between the neighboring end portions of two pipes. The coupling comprises an elastic sleeve having two open ends, an external surface, an internal surface and an annular partition which extends from the internal surface intermediate the two open ends and between those end portions of the pipes which are inserted into the sleeve through the respective open ends. The coupling further comprises a clamp including a split ring which surrounds the external surface of the sleeve and has first and second end portions, female tightening means comprising first and second substantially strip-shaped components which are externally bonded to the respective end portions of the split ring and each of which extends transversely of the split ring with a median section of each component spaced apart from and defining a passage with the respective end portion of the ring, and male tightening means comprising a shank extending through the passages and two retaining elements extending radially from the shank and flanking the median sections of the two components.

The ring preferably comprises or constitutes a band having an internal corrugation which extends into a circumferential groove in the external surface of the sleeve and two marginal portions which are spaced apart from the corrugation and preferably overlie the open ends of the sleeve. The passages are aligned with the corrugation and the two components of the female tightening means are bonded to the band intermediate the corrugation and the marginal portions as well as to the marginal portions of the band. Each component is preferably bonded to the band at a plurality of locations at each side of the respective median section. Such pluralities of locations preferably form rows which make oblique angles with the plane of the corrugation.

The end sections of the two components (i.e., the sections which flank the respective median sections) preferably resemble parallelograms and are bonded (preferably spot welded) to the band. The width of each end section (as considered in the circumferential direction of the sleeve) can exceed the width of the respective median section, and each such relatively wide end section can be bonded to the band at n locations (wherein n is a whole number exceeding two), and at least two of each n locations are preferably more distant from the gap between the two components of the female tightening means than the respective median section.

One of the retaining elements on the shank of the male tightening means preferably constitutes a head which is rigid with the shank and has an end face provided with a non-circular (e.g., hexagonal) socket. The other retaining element can include a nut which mates which an externally threaded portion of the shank and has a portion (e.g., one corner of a square nut) extending into the corrugation of the band so that the nut is held against rotation relative to the shank but the latter can be rotated by a suitable tool whose working end is inserted into the socket of the head.

The internal surface of the sleeve is preferably formed with two grooves which flank the partition and the depth of each of which increases in a direction away from the partition and toward the respective open end of the sleeve. The sleeve preferably further comprises two circumferentially complete ribs each of which is disposed between one of the grooves and the respective open end of the sleeve. Each of the ribs has a facet which is adjacent to the respective open end of the sleeve and preferably tapers radially inwardly toward the partition.

In accordance with the presently preferred embodiment of the clamp, its male tightening means comprises a single shank, i.e., the passages which are defined by the median sections of the two components of the female tightening means and the band can receive only a single shank.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a flexible pipe coupling which embodies one form of the invention;

FIG. 2 is an end elevational view of the coupling as seen from the left-hand side of FIG. 1, with a portion of the sleeve broken away;

FIG. 3 is an enlarged fragmentary sectional view as seen in the direction of arrows from the line I—I of FIG. 1, further showing those end portions of two metallic pipes which are sealingly connected to each other;

FIG. 4 is a plan view of one of the two components of the female tightening means in the coupling of FIGS. 1 to 3; and FIG. 5 is a fragmentary plan view of a modified component wherein the width of the end sections exceeds the width of the median section.

DESCRIPTION OF THE PREFERRED EMBODIMENTS

Referring first to FIGS. 1 to 4, there is shown a flexible coupling which serves to sealingly connect the end portions of two metallic or plastic pipes 3 to each other in such a way that the seal is established when the axes of the two pipes coincide as well as when the axis of one of the pipes is inclined to a certain extent with reference to the axis of the other pipe. The improved coupling comprises a sleeve 1 which consists of rubber or an elastomeric synthetic plastic material (such as EPDM) and a clamp 2 which surrounds the sleeve and urges the latter's internal surface 1a into adequate sealing engagement with the external surfaces of the end portions of the pipes 3. Moreover, the clamp 2 ensures that the sleeve 1 is capable of withstanding certain forces which tend to move the end portions of the pipes 3 away from each other. Such end portions are inserted through the respective open ends of the sleeve 1 and preferably abut against the respective sides of a circumferentially complete annular partition 4 which extends inwardly from the internal surface 1a and may but need not extend all the way to the internal surfaces of the pipes. At any rate, the inner diameter of the partition 4 is smaller than the outer diameters of the pipes 3. As can be seen in FIG. 3, the end faces of the two pipes 3 abut against the respective sides of the partition 4 when the coupling is properly assembled.

The partition 4 is flanked by two circumferentially complete grooves 5 which are provided in the internal surface 1a of the sleeve 1 and are separated from the respective open ends by circumferentially complete ribs 6. The diameters of surfaces or facets 7 at the outer sides of the ribs 6, as considered in the axial direction of the sleeve 1, decrease gradually in directions from the respective open ends of the sleeve toward the partition 4, and the same applies for the surfaces or facets 8 at the inner sides of the ribs 6 as well as for the surfaces 9 which flank portions of the grooves 5 adjacent to the respective sides of the partition 4. As can be readily seen in FIG. 3, the depth of each groove 5 increases gradually all the way from the respective surface 9 to the respective facet 8. The inner diameters of the ribs 6 in undeformed condition of the sleeve 1 can match or approximate the outer diameters of the pipes 3. The diameters of the facets 7 and 8 on the ribs 6 need not vary gradually (as shown in FIG. 3) but can vary at a different rate, e.g., each of the facets 7 and 8 can have a concave or a convex shape without departing from the spirit of the invention.

The external surface 1b of the sleeve 1 is formed with a circumferentially complete groove 10 which has a substantially triangular cross-sectional outline and is preferably disposed midway or substantially midway between the open ends of the sleeve, the same as the partition 4.

The clamp 2 comprises a substantially C-shaped split ring 11 which is a band preferably made of sheet steel and preferably having a width (i.e., axial length) of 40 mm ± 10 mm (most preferably 40 mm ± 5 mm) when the outer diameters of the pipes 3 are in the range of 112 mm ± 3 mm. The two end portions of the band 11 are bonded (preferably welded) to discrete strip-shaped components 12 and 13 which constitute the female tightening means for the band 11. Each of the components 12, 13 has a substantially centrally located median section 14 defining with the respective end portion of the band 11 a passage 14d (see FIG. 3) and such passages are in register with the respective portions of the circumferentially extending channel or groove defined by a corrugation 17 of the band 11. The corrugation 17 extends into the groove 10 in the external surface 1b of the sleeve 1. Each median section 14 can have a concave internal surface conforming substantially to the outline of the adjacent portion of a shank 15 which forms part of the male tightening means of the clamp 2 and extends through the two passages 14d. The male tightening means further comprises two retaining elements 15a and 15b which flank the median sections 14 of the two components 12, 13 (see FIG. 1) and one of which can be moved nearer to the other in order to enhance the tightening action of the band 11 upon the sleeve 1 and hence the sealing engagement between the internal surface 1a of the sleeve and the external surfaces of the pipes 3. An arcuate insert 16 is provided in the groove 10 between the median sections 14 of the components 12 and 13; the end portions of the insert 16 (as considered in the circumferential direction of the band 11) are overlapped by the respective end portions of the band. The marginal portions 18 of the band 11 are spaced apart from the corrugation 17 and have a preferably frustoconical shape. They slope inwardly toward the peripheral surfaces of the respective pipes 3 in directions away from the partition 4 and they overlie the respective open ends of the sleeve 1. The marginal portions 18 of the band 11 are inwardly adjacent to similarly configurated end sections 14a of the components 12 and 13. The median section 14 of each of the components 12, 13 is flanked by two end sections 14a. The open ends of the sleeve 1 are preferably surrounded by frustoconical portions 19 of the external surface 1b of the sleeve 1, and the portions 19 of the surface 1b are contacted by the inner sides of the respective marginal portions 18. The smallest diameters of the marginal portions 18 exceed the smallest diameters of the ribs 6 but are preferably less than the smallest diameters of frustoconical surfaces bounding the bottoms of the grooves 5 in the internal surface 1a of the sleeve 1 when the band 11 is not under tension.

As can be seen in FIGS. 2 and 4, each of the components 12, 13 is a strip of metallic material (e.g., sheet steel, the same as the material of the band 11) which extends across the full width (axial length) of the band 11. Each of these components is externally bonded to the respective end portion of the band 11, e.g., in a manner as shown in FIG. 4. The arcuate tunnel-shaped median section 14 of each of the components 12, 13 may but need not exactly conform to the outline of the respective portion of the shank 15, and a corner of a square nut constituting the retaining element 15b extends into the channel that is defined by the adjacent portion of the corrugation 17 of the band 11 so that the nut 15b cannot rotate relative to the shank 15. The shank 15 is provided with a head constituting the retaining element 15a, and the end face of the head 15a has a polygonal (e.g., hexagonal socket 15a' which can receive the working end of a suitable tool serving to rotate the shank 15 in a direction to move the head 15a nearer to or further away from the nut 15b, i.e., to increase or reduce the width of the gap 114 between the two median sections 14.

The two outer sections 14a of each of the two components 12, 13 are spot welded to the adjacent portions of the band 11, e.g., in a manner as shown in FIG. 4. Each of the end portions 14a is welded to the band 11 at two locations $P_1$ and $P_2$ forming a row (denoted by a straight line V) which makes an oblique angle with the general plane of the corrugation 17. One ($P_2$) of the spot welds is provided in the region 11' between the corrugation 17 and the respective marginal portion 18, and the other ($P_1$) of the spot welds is provided in the region of the respective marginal portion 18.

As can be seen in FIG. 4, each of the end sections 14a is a parallelogram and the lines V make with the plane of the corrugation 17 identical angles $beta_1$ and $beta_2$, i.e., the left-hand spot welds $P_1$ and $P_2$ of FIG. 4 are mirror symmetrical to the right-hand spot welds with reference to the plane of the corrugation 17. The number of spot welds at each side of such plane can be increased to three or more, and the welds at each side of the plane preferably form a straight row.

An advantage of the configuration of end sections 14a and of the distribution of spot welds in a manner as shown in FIG. 4 is that the force which the male tightening means 15, 15a, 15b applies to the components 12 and 13 is transmitted not only to the regions 11' but also to the marginal portions 18 of the band 11. In fact, the radially innermost parts of the marginal portions 18 of the band 11 can be moved all the way into pronounced engagement with the external surfaces of the respective pipes 3 to resist the forces which tend to move the pipes axially and away from each other as well as those forces which tend to move the axis of one of the pipes out of alinement with the axis of the other pipe.

The inclination of the rows of spot welds $P_1$ and $P_2$ at acute angles $beta_1$ and $beta_2$ reduces the stresses upon the spot welds, i.e., such stresses are less pronounced than if the angles $beta_1$ and $beta_2$ were to equal or approximate 90 degrees. Moreover, such inclination of the lines V with reference to the plane of the corrugation 17 reduces the likelihood of tilting of the components 12, 13 about axes which are parallel to the axis of the sleeve 1 when the distance between the head 15a and the nut 15b is being reduced in response to rotation of the shank 15 in the appropriate direction.

The insert 16 has a corrugation which is similar to the corrugation 17 and extends into the adjacent portion of the groove 10 in the external surface 1b of the sleeve 1. The corrugation of the insert 16 extends all the way between the two ends of this insert, as considered in the circumferential direction of the band 11, and the end portions of the corrugation of the insert 16 receive the respective end portions of the insert 17. The corrugation 16 has marginal portions 20 (one of these marginal portions can be seen in FIG. 1) which are at least substantially aligned with the corresponding marginal portions 18 of the band 11.

The improved coupling is assembled and manipulated as follows:

The end portions of the pipes 3 are introduced through the respective open ends of the sleeve 1 so that their end faces abut against the corresponding sides of the partition 4. The band 11 surrounds the external surface 1b of the sleeve 1 and the insert 16 extends across the gap 114 between the components 12 and 13. The shank 15 of the male tightening means is then rotated by means of a tool whose working end extends into the socket 15a' of the head 15a so as to move the head 15a nearer to the nut 15b whereby the band 11 is tightened around the sleeve 1 and its marginal portions 18 are caused to engage the external surfaces of the respective pipes 3. Tensioning of the band 11 around the sleeve 1 entails a densification of the material of the sleeve 1 at least in the regions of the ribs 6 and an elongation of the sleeve, i.e., the material of the sleeve migrates toward the respective axial ends of the band 11. Reference may be had to FIGS. 2, 3 and 4 of the copending application Ser. No. 664,346. The material of the sleeve 1 further undergoes densification in the regions 21 where the material of the partition 4 merges into the material of the central portion of the sleeve 1 inwardly adjacent to the groove 10. Deformation of the sleeve 1 in the regions of the ribs 6 and in the regions 21 results in deformation of the facets 7, 8 and surfaces 9. If the head 15a is caused to move toward the nut 15b after the radially innermost parts of the marginal portions 18 and 20 already engage the external surfaces of the respective pipes 3, the conicity of the marginal portions 18 and 20 decreases and the force with which the band 11 and the insert 16 bear against the pipes increases accordingly. A reduction of the thickness of the sleeve 1 in response to tightening of the band 11 therearound and the resulting lengthening of the sleeve (as considered in the axial direction of the pipes 3) increases the area of contact between the internal surface 1a of the sleeve and the external surfaces of the pipes which enhances the sealing action of the sleeve, the ability of the sleeve to withstand changes in the orientation of pipes 3 relative to each other, and as movements of the pipes axially and away from one another. As mentioned above, movement of the marginal portions 18 and 20 of the band 11 and insert 16 into actual contact with the external surfaces of the respective pipes 3 enables the parts 11 and 16 to assist the sleeve 1 in resisting changes in the inclination of one of the pipes relative to the other pipe as well as movements of the two pipes substantially axially and away from each other. Moreover, the deformed marginal portions 18 and 20 exhibit a tendency to return the pipes 3 into positions of axial alignment with each other as soon as the magnitude of forces which have caused misalignment of the two pipes is reduced sufficiently to enable the marginal portions 18 and 20 to perform their restoring action. Still further, the feature that the marginal portions 18 and 20 of the band 11 and insert 16 are permitted or caused to move into actual contact with the external surfaces of the respective pipes 3 ensures that the material of the sleeve 1 cannot be subjected to excessive compressive stresses beyond the elastic limit such as could result in damage to or in total destruction of the sleeve.

The provision of the corrugation 17 brings about the advantage that the band 11 can yield in response to movement of one of the pipes 3 out of exact axial alignment with the other pipe, i.e., the corrugation 17 acts not unlike a hinge between the two regions 11' of the band 11 and the band continues to maintain the sleeve 1 in sealing engagement with both pipes even if one of the pipes is moved out of exact axial alignment with the other pipe. In other words, the corrugation 17 contributes to the ability of the band 11 to maintain the sleeve 1 in sealing engagement with the end portions of both pipes as long as the mutual inclination of the axes of the two pipes remains within a certain range. An additional important and desirable function of the corrugation 17 is that it holds the band 11 against axial shifting relative to the sleeve 1 and vice versa. While such axial shifting could be prevented by the corrugation 17 even in the absence of the external groove 10, the provision of this groove in the external surface 1b of the sleeve 1 is desirable and advantageous because it allows for practically automatic centering of the band 11 on the sleeve 1 and vice versa, as considered in the axial direction of the pipes 3. Still further, when the distance between the head 15a and the nut 15b is being reduced, the internal surface of the corrugation 17 and internal surface of the corrugation in the insert 16 cooperate to densify the material of the sleeve 1 in the regions 21 to thus ensure the establishment of a highly satisfactory sealing action between the sleeve and the end portions of the pipes 3. The marginal portions 18 and 20 also contribute to the centering action of the band 11 and insert 16 upon the sleeve 1.

The improved coupling can establish a highly reliable seal between pairs of pipes and can hold such pipes against axial movement away from each other as well as resist changes in the mutual inclination of the axes of the two pipes even if the actual outer diameter of one of the pipes deviates from the desired (nominal) diameter, i.e., even if the outer diameter of one of the pipes is less than or exceeds the outer diameter of the other pipe. Thus, the sleeve 1 is simply caused to contract to a greater extent around the pipe whose end portion has a smaller diameter. This does not bring about a noticeable difference in densification of the material of the sleeve 1 in the two regions 21. Furthermore, the partition 4 can establish a highly satisfactory seal between the sleeve 1 and the end face of the larger-diameter and/or smaller-diameter pipe so that such seal compensates for somewhat less pronounced sealing engagement between the sleeve 1 and the one or the other pipe in the corresponding region 21.

The inclined facets 7 at the outer sides of the ribs 6 facilitate the insertion of the end portions of pipes 3 through the respective open ends of the sleeve 1. Moreover, the facets 7 cooperate with the facets 8 to entail an erection of the respective ribs 6 in response to the application of forces which tend to extract the end portions of the pipes 3 from the sleeve 1 whereby the ribs 6 tend to expand radially inwardly and offer a progressively increasing resistance to extraction of the respective pipes from the sleeve. In other words, friction between the internal surfaces of the ribs 6 and the external surfaces of the respective pipes 3 increases proportionally or substantially proportionally with the magnitude of forces which tend to extract the end portions of the pipes from the sleeve. Moreover, the sealing action of the sleeve 1 in the regions of its ribs 6 increases, due to the fact that the ribs are undercut at their sides facing the respective recesses 5, as soon as the two pipes tend to move axially and away from each other, e.g., in response to increasing pressure of the fluid medium which flows through the pipes. The feature that the diameters of the bottom surfaces in the grooves 5 increase in directions from the respective regions 21 toward the respective ribs 6 ensures that the ribs 6 are not coiled or rolled up in response to insertion of the end portions of the pipes through the respective open ends of the sleeve 1, i.e., the ribs 6 are simply bent and continue to exhibit a pronounced tendency to reerect themselves as soon as permitted by the end portions of the respective pipes.

An advantage of the insert 16 and its corrugation is that the longitudinal axis of the shank 15 can be moved very close to the external surface of the sleeve 1, i.e., that the parts 15a and 15b of the male tightening means of the clamp 2 can act upon and apply forces to the outer edge faces of the corresponding median sections 14 very close to the end portions of the band 11. Therefore, the bending moments which must be withstood by the components 12 and 13 in response to the application of a given clamping force via elements 15a and 15b are less pronounced than if the axis of the shank 15 were more distant from the adjacent portion of the sleeve 1. Furthermore, such positioning of the axis of the shank 15 relative to the sleeve 1 ensures that the shank is subjected to lesser bending stresses when the width of the gap 114 is rather pronounced (when the outer diameters of the pipes 3 are large) and is being reduced in response to movement of the head 15a toward the nut 15b because that portion of the shank 15 which extends across the gap 114 can enter the corrugation of the insert 16 and the end portions of the corrugation 17. This renders it possible to greatly increase the force which tightens the band 11 around the sleeve 1 without risking separation of the components 12, 13 from the band and/or excessive deformation of the shank 15. The radii of curvature of the surfaces bounding the outer sides of the corrugation 17 and of the corrugation of the insert 16 can be altered so as to allow for even deeper penetration of the shank 15 toward the axis of the sleeve 1 than illustrated in FIG. 3. In fact, the configuration of the corrugation 17 and of the corrugation of the insert 16 can be selected in such a way that a portion of the head 15a extends into the adjacent portion of the corrugation 17; this brings the axis of the shank 15 even closer to the axis of the sleeve 1.

The insert 16 can form an integral part of the one or the other end portion of the band 11. However, it is also possible to mass-produce the insert 16 as a separate part and to thereupon weld one of its end portions to the inner side of one end portion of the band 11. At least one end portion of the insert 16 can be stepped so as to fit into the corresponding end portion of the band 11. This can be seen in FIG. 1 wherein the central portion of the insert 16 is offset radially inwardly with reference to the adjacent end portions of the band 11. This renders it possible to place the ends of the marginal portions 20 of the insert 16 inwardly of the adjacent ends of the marginal portions 18 of the band 11.

An important advantage of the improved coupling is that the components 12 and 13 of the clamp 2 exhibit a highly pronounced resistance to bending and other deforming stresses because they are subjected primarily to shearing stresses. Therefore, the male tightening means 15, 15a, 15b can be applied with greater force without risking premature or excessive deformation of the components 12 and 13 or their separation from the band 11. As mentioned above, this enhances the ability of the improved coupling to furnish a reliable sealing action and to offer greater resistance to movements of the pipes 3 axially and away from each other. Moreover, the components 12 and 13 can be stressed sufficiently to ensure the establishment of a reliable seal and of requisite resistance to axial movements of the pipes away from each other even if the outer diameter of the end portion of one pipe greatly or substantially exceeds the outer diameter of the end portion of the other pipe. This is due, at least in part, to the fact that the components 12 and 13 can be readily flexed about axes which are normal to the axis of the sleeve 1 so as to account for the difference (if any) between the outer diameters of the pipes without risking a premature separation of the end sections 14a from the band 11. The distance between the components 12, 13 (i.e., the width of the gap 114) can be observed with the naked eye so that the person in charge or an inspector can ascertain the magnitude of the force which has been applied to maintain the sleeve 1 in sealing engagement with the external surfaces and the end faces of the two pipes.

Another important advantage of the components 12, 13 and of their novel mounting on the end portions of the band 11 is that they ensure a more uniform distribution of applied forces across the full width of the band 11 and sleeve 1. The forces are transmitted to the marginal portions 18 of the band 11 in close or immediate proximity of the male tensioning means 15, 15a, 15b. This, in turn, allows for uniform distribution of forces in the circumferential direction of the band 11 and a more reliable engagement of each and every portion of each of the marginal portions 18 and 20 with the external surface of the respective pipe 3 in response to adequate tightening of the band around the sleeve 1. Moreover, the mass of the components 12, 13 is relatively small (when compared with the mass of projections which are utilized in the coupling of the aforediscussed copending application); the thickness of the components 12, 13 can be much less than the thickness of the legs of L-shaped projections. The utilization of relatively thin components 12 and 13 simplifies their bonding to the band 11, especially by spot welding or an equivalent technique. Furthermore, the spot welds are highly satisfactory insofar as their resistance to the shearing and other stresses is concerned. The magnitude of stresses other than shearing stresses is small or even negligible because the axis of the single shank 15 can be placed close or very close to the adjacent portion of the sleeve 1 which entails a pronounced reduction of bending moments which are applied to the components 12 and 13 in response to movement of the head 15a toward the nut 15b. As explained above, not only a portion of the shank 15 but also a portion of the head 15a can actually extend into the corrugation 17 and into the corrugation of the insert 16 to thus ensure a reduction or elimination of bending moments. In other words, the lever arm produced by the parts 15, 15a, 15b and acting upon the components 12 and 13 is rather short. The radial forces acting upon the marginal portions 18 and 20 are more pronounced than in heretofore known couplings and such forces are more uniformly distributed as considered in the circumferential direction of the sleeve 1 which brings about the aforediscussed advantages including a more reliable retention of the pipes 3 in positions of axial alignment with each other and greater resistance to movement of the pipes axially and away from each other as soon as the marginal portions 18 and 20 are caused to actually engage the external surfaces of the respective pipes.

The aforediscussed distribution of spot welds which bond the end sections 14a of the components 12 and 13 to the end portions of the band 11 so that the end sections 14a lie flat against the band has been found to contribute significantly to reliability of the bonds and to a reduction of the tendency of the components 12 and 13 to tilt relative to the band 11 in response to movement of their median sections 14 nearer to each other. The more distant welds $P_1$ are especially effective in preventing a tilting of the components 12 and 13 relative to the corresponding end portions of the band 11 when the head 15a is caused to move nearer to the nut 15b. It has been ascertained that the ability of welds which are distributed in a manner as shown in FIG. 4 to resist tilting of the components 12 and 13 is much more pronounced than the ability of welds which form straight rows extending in the axial direction of the sleeve 1. The illustrated configuration of the components 12 and 13, namely, so that the end sections 14a taper away from the gap 114 as considered in directions from the corresponding median section 14 toward the longitudinal edges of the band 11, also contributes to the establishment of more reliable bonds between the two components and the band 11 because the welds $P_1$ and $P_2$ can be placed at a greater distance from the gap 114 even though they are or can be disposed substantially centrally of the corresponding end sections 14a (as considered in the circumferential direction of the sleeve 1). The inclination of the end sections 14a may but need not always match the inclination of the rows of spot welds $P_1$, $P_2$ with reference to the plane of the corrugation 17. It will be readily appreciated that the spot welds in end sections 14a which taper outwardly and away from the gap 114 can offer a much greater resistance to tilting of the components 12, 13 relative to the respective end portions of the band 11 than spot welds which form rows extending at right angles to the plane of the corrugation 17. Moreover, such spot welds (including those which are more distant from the gap 114) are subjected to less pronounced stresses of the nature tending to separate the end sections 14a from the band 11.

The illustrated square nut 15b can be replaced with a hexagonal nut or an otherwise configurated nut without departing from the spirit of the invention. A square nut is preferred at this time because one of its corners can penetrate well into the corrugation 17 to thus offer a pronounced resistance to rotation of the nut about the axis of the shank 15.

FIG. 5 shows a portion of a slightly modified clamp 2' wherein the width of the end sections 14b of each of the two components (only the component 12' is actually shown) exceeds the width of the median section 14, as considered in the circumferential direction of the band 11. Moreover, the number (n) of spot welds ($P_1$, $P_2$ and $P_3$) where each of the end sections 14b is bonded to the portions 11' and 18 of the band 11 exceeds two, and at least two ($P_1$ and $P_3$) of the spot welds are more distant from the gap 114 than the respective median section 14. The angles $beta_1$ (not shown in FIG. 5) and $beta_2$ can be selected in the same way as described with reference to FIG. 4. In the embodiment of FIG. 5, the angle $beta_2$ is somewhat smaller than the angle $beta_2$ which is shown in FIG. 4. The distance between the gap 114 and the weld $P_1$ exceeds the distance between the gap and the weld $P_3$. As mentioned above, at least a portion of each of the welds $P_1$ and $P_3$ is more distant from the gap than that edge face 14e of the illustrated median section 14 which is engaged by the head 15a or the nut 15b of the male tightening means (such male tightening means has been omitted in FIG. 5 for the sake of clarity). The just described distribution of spot welds even further reduces the likelihood of tilting of the component 12' in response to tightening of the band 11 around the sleeve 1 (not shown in FIG. 5) and/or the likelihood of destruction of bonds which are established by the welds $P_1$ and $P_3$. The number of locations where the illustrated end section 14b of the component 12' is bonded to the band 11 can be increased to four or more.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for the establishment of a fluidtight connection between the neighboring end portions of two pipes, comprising an elastic sleeve having two open ends, an external surface, an internal surface, and an annular partition extending from said internal surface intermediate said open ends and between those end portions of the pipes which are inserted into the sleeve through the respective open ends; and a clamp including a split ring surrounding said external surface and having first and second end portions, and female tightening means comprising first and second substantially strip-shaped components externally bonded to the respective end portions of said split ring and each extending transversely of the split ring, each of said components having a tunnel-like median section with a circumferential extent greater than the strip thickness spaced apart from and defining a passage with the respective end portion of said split ring, and said clamp further including male tightening means comprising a shank extending through said passages and two retaining elements extending from said shank and flanking the median sections of said components, said split ring including a band having two marginal portions overlying the open ends of said sleeve, and each of said marginal portions sloping inwardly as considered in a direction away from said partition and defining an acute angle with the longitudinal axis of said sleeve, said components being bonded to said band at said marginal portions.

2. The coupling of claim 1, wherein said band has an internal corrugation extending into the external surface of said sleeve and spaced apart from said marginal portions, said passages being aligned with said corrugation, and said components being bonded to said band intermediate said corrugation and said marginal portions.

3. The coupling of claim 1, wherein said internal surface has two grooves flanking said partition and the depth of each of said grooves increases in a direction away from said partition and toward the respective open end of said sleeve.

4. The coupling of claim 1, wherein said sleeve has two circumferentially complete internal grooves provided in said internal surface at the opposite sides of said partition and a third circumferential groove provided in said external surface, said split ring having a corrugation extending into said third groove.

5. The coupling of claim 4, wherein said sleeve has surfaces flanking portions of said internal grooves adjacent said partition and sloping radially outwardly in directions away from said partition and toward the respective open ends of said sleeve.

6. The coupling of claim 4, wherein said sleeve comprises two ribs each disposed between one of said internal grooves and the respective open end of said sleeve, each of said ribs having a facet adjacent to the respective open end of the sleeve and sloping radially inwardly toward said partition.

7. The coupling of claim 1, wherein said male tightening means comprises a single shank.

8. The coupling of claim 1, wherein said band terminates at said marginal portions and each of said marginal portions slopes inwardly at an acute angle to said longitudinal axis in its entirety.

9. The coupling of claim 8, wherein said marginal portions extend beyond the open ends of said sleeve.

10. A coupling for the establishment of a fluidtight connection between the neighboring end portions of two pipes, comprising an elastic sleeve having two open ends, an external surface, an internal surface, and an annular partition extending from said internal surface intermediate said open ends and between those end portions of the pipes which are inserted into the sleeve through the respective open ends; and a clamp including a split ring surrounding said external surface and having first and second end portions, and female tightening means comprising first and second substantially strip-shaped components externally bonded to the respective end portions of said split ring and each extending transversely of the split ring, each of said components having a median section spaced apart from and defining a passage with the respective end portion of said split ring, and said clamp further including male tightening means comprising a shank extending through said passages and two retaining elements extending from said shank and flanking the median sections of said components, said split ring including a band having an internal corrugation extending into the external surface of said sleeve and two marginal portions spaced apart from said corrugation and overlying the open ends of said sleeve, and said passages being aligned with said corrugation, said components being bonded to said band intermediate said corrugation and said marginal portions as well as at said marginal portions, and each of said components being bonded to said band at a plurality of locations at each side of the respective median section, each of said pluralities of locations forming a row which makes an oblique angle with the plane of said corrugation. the neighboring end portions of two pipes, comprising an elastic sleeve having two open ends, an external surface, an internal surface, and an annular partition extending from said internal surface intermediate said open ends and between those end portions of the pipes which are inserted into the sleeve through the respective open ends; and a clamp including a split ring surrounding said external surface and having first and second end portions, and female tithtening means comprising first and second substantially strip-shaped components externally bonded to the respective end portions of said split ring and each extending transversely of the split ring, each of said components having a median section spaced apart from and defining a passage with the respective end portion of said split ring, and said clamp further including male tightening means comprising a shank extending through said passages and two retaining elements extending from said shank and flanking the median sections of said components, said split ring including a band having an internal corrugation extending into the external surface of said sleeve and two marginal portions spaced apart from said corrugation and overlying the open ends of said sleeve, and said passages being aligned with said corrugation, said components being bonded to said band intermediate said corrugation and said marginal portions as well as at said marginal portions, and each of said components being bonded to said band at a plurality of locations at each side of the respective median section, each of said pluralities of locations forming a row which makes an oblique angle with the plane of said corrugation.

11. A coupling for the establishment of a fluidtight connection between the neighboring end portions of two pipes, comprising an elastic sleeve having two open ends, an external surface, an internal surface, and an annular partition extending from said internal surface intermediate said open ends and between those end portions of the pipes which are inserted into the sleeve through the respective open ends; and a clamp including a split ring surrounding said external surface and having first and second end portions, and female tightening means comprising first and second substantially strip-shaped components externally bonded to the respective end portions of said split ring and each extending transversely of the split ring, each of said components having a median section spaced apart from and defining a passage with the respective end portion of said split ring, and said clamp further including male tightening means comprising a shank extending through said passages and two retaining elements extending from said shank and flanking the median sections of said components, said split ring including a band having an internal corrugation extending into the external surface of said sleeve and two marginal portions spaced apart from said corrugation and overlying the open ends of said sleeve, and said passages being aligned with said corrugation, said components being bonded to said band intermediate said corrugation and said marginal portions a well as at said marginal portions, and each of said components further including two end sections each of which is a parallelogram and is bonded to said band.

12. The coupling of claim 11, wherein the width of each of said end sections, as considered in the circumferential direction of said sleeve, exceeds the width of the respective median section.

13. The coupling of claim 12, wherein said components are separated from each other by a gap and each of said end sections is bonded to said band at n locations wherein n is a whole number exceeding two, at least two of said n locations being more distant from said gap than the respective median section.

14. A coupling for the establishment of a fluidtight connection between the neighboring end portions of two pipes, comprising an elastic sleeve having two open ends, an external surface, an internal surface, and an annular partition extending from said internal surface intermediate said open ends and between those end portions of the pipes which are inserted into the sleeve through the respective open ends; and a clamp including a split ring surrounding said external surface and having first and second end portions, and female tightening means comprising first and second substantially strip-shaped components externally bonded to the respective end portions of said split ring and each extending transversely of the split ring, each of said components having a median section spaced apart from and defining a passage with the respective end portion of said split ring, and said clamp further including male tightening means comprising a shank extending through said passages and two retaining elements extending from said shank and flanking the median sections of said components, said split ring including a band having an internal corrugation extending into the external surface of said sleeve and two marginal portions spaced apart from said corrugation and overlying the open ends of said sleeve, and said passages being aligned with said corrugation, said components being bonded to said band intermediate said corrugation and said marginal portions as well as at said marginal portions, and said shank having external threads, one of said retaining elements including a head rigid with said shank and having an end face provided with a non-circular socket, and the other of said retaining elements including a nut mating with said shank and having a portion extending into said corrugation so that said nut is held against rotation on said shank, the latter being rotatable by a tool which is inserted into said socket.

* * * * *